US006438434B1

(12) United States Patent
Kamiya

(10) Patent No.: US 6,438,434 B1
(45) Date of Patent: Aug. 20, 2002

(54) MIXING, CODING AND DECODING DEVICES AND METHODS

(75) Inventor: Ryo Kamiya, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 08/864,552

(22) Filed: May 27, 1997

(30) Foreign Application Priority Data

May 29, 1996 (JP) ........................................ 8-135163
Sep. 19, 1996 (JP) ........................................ 8-248368

(51) Int. Cl.[7] ........................ G06F 17/00; H04B 1/00
(52) U.S. Cl. ...................................... 700/94; 381/119
(58) Field of Search .......................... 381/119, 2, 61; 341/143, 141; 375/260, 247; 370/535, 536, 537, 538, 540, 542, 544, 486, 493; 700/94

(56) References Cited

U.S. PATENT DOCUMENTS 5,208,594 A * 5/1993 Yamazaki .................. 341/143
5,561,425 A * 10/1996 Therssen .................. 341/143
5,627,536 A * 5/1997 Ramirez .................. 341/143
5,768,316 A * 6/1998 Sogo .................. 375/260
5,774,567 A * 6/1998 Heyl .................. 381/119
5,790,072 A * 8/1998 Gerveshi et al. ............ 341/141

* cited by examiner

*Primary Examiner*—Xu Mei
(74) *Attorney, Agent, or Firm*—Morrison & Foerster LLP

(57) ABSTRACT

A plurality of analog signals are subjected to a delta sigma modulation for conversion into respective bitstream data (PDM). The respective bitstream data are weighted for conversion into respective plural-bit PCM data, and then these plural-bit PCM data corresponding to the analog signals are added together. At that time, optional PCM to be mixed with the analog signals may also be added. PCM data resultant from the addition is then subjected to a delta sigma modulation for conversion into bitstream data. In this way, the mixed data is provided as one bitstream data. The mixed data can be coded as PCM data by performing a decimation process on the mixed data. The mixed data can also be provided as analog data by subjecting the mixed data to an analog low-pass filtering process.

28 Claims, 8 Drawing Sheets

MIXING, CODING AND DECODING DEVICES AND METHODS

BACKGROUND OF THE INVENTION

The present invention relates to an improved mixing device and a mixing method, and coding and decoding devices and methods employing such an improved mixing device or method.

The present invention also relates to a improved mixing device for mixing audio signals which minimizes signal deterioration resulting from multi-stage connection of mixing circuits, as well as an audio system using such an improved mixing device.

As known in the art, the CODEC (abbreviation of Coder-Decoder) is an indispensable means to enable information communication between an analog signal system and a digital signal system, and generally comprises an A/D converter for converting an analog signal into a digital signal and a D/A converter for converting a digital signal into an analog signal. In recent years, CODECs employing a so-called "oversampling" technique have been attracting the attention of many people who desire to simplify the analog circuitry contained therein. In these CODECs, analog signals are converted, via an A/D converter based on a delta sigma modulation scheme, into bitstream data of a much higher bit rate than the frequency of the analog signals. The bitstream data are then subjected to a filtering process, "decimation" process, etc. to provide high-quality PCM data of minimized noises.

Also, with today's technological diversification, there is an increasing demand that the CODECs should have various other functions than the above-noted signal format conversion, among which is a mixing function to synthesize a plurality of input signals. To meet such a demand with the CODEC using the oversampling technique, it may be useful to first mix or synthesize a plurality of analog signals and then convert them into bitstream data, or to first convert a plurality of analog signals into bitstream data and then subject the data to a "decimation" process (i.e., process to convert the data into low-sampling-frequency and multiple-bit data), followed by mixing of these data.

However, the above-noted mixing technique has various problems as follows.

(1) Problem of Electrical Characteristics:

When the required mixing is performed on analog signals, unwanted entry of noises into the signals and distortion of the signals would unavoidably result during the mixing. Such noises and signal distortion may be reduced by use of a good-performance analog circuit, which, however, makes it necessary to apply relatively high electric current to the analog circuit, thus leading to in increased overall electric current consumption by the CODEC.

(2) Problem of Costs:

The mixing analog circuit has to have high resistance to adjust the mixing level, which would require a great space to accommodate a level adjusting resistor in an IC circuit implementing the CODEC, thereby increasing the size or area of the IC circuit chip. In addition, it is generally difficult to reduce the size of analog circuit. Therefore, in cases where the mixing circuit is analog one, reduction in size of the CODEC IC circuit is hard to achieve.

(3) Problem of Productivity:

Normally, after the CODEC IC circuit is manufactured, a test is carried out to check the performance of the IC circuit, in which it is necessary to determine whether or not the analog circuit properly performs a desired mixing function. However, this determination would be time-consuming because it has to be done via analog measurement using an analog tester.

(4) Problem of Quality:

The analog circuit is more susceptible to manufacturing unevenness or variations than the digital counterpart. Thus, in cases where the mixing circuit is analog, it is more likely that mixing circuits unable to provide desired performance will be produced.

The problems as set forth above are found not only in CODECs but also various other devices that require a function to mix bit stream data.

There are known two audio-signal mixing methods: one of the two is to synthesize a plurality of audio signals in analog form; and the other is to synthesize a plurality of audio signals in the form of digitized PCM data. The first-said method allows the necessary mixers to be constructed at a relatively low cost but is susceptible to noises, so that intolerable signal deterioration would often occur at the last-stage mixing output if the mixing circuits are connected in a multi-stage fashion. Further, the second-said method can avoid the problems of unwanted noises and signal deterioration because digitized PCM data are synthesized in this method; however, the overall cost of a device employed would substantially increase because channel-by-channel synchronization is required.

SUMMARY OF THE INVENTION

It is therefore a primary object of the present invention to provide a mixing device and a mixing method which are capable of mixing bitstream data without having to convert the data into analog representation, as well as coding and decoding devices and methods employing such a mixing device or method.

It is a second object of the present invention to provide an audio signal interface device which is simple in construction and yet permits appropriate input of analog audio signals of plural channels.

It is a third object of the present invention to provide a mixing device which can perform high-quality mixing at low cost with minimized influence of noises and signal deterioration, as well as an audio system employing such a mixing device.

In order to accomplish the above-mentioned objects, the present invention provides a mixing device for mixing plural bitstream data, which comprises: a weighting circuit that weights a plurality of bitstream data for conversion thereof into respective plural-bit digital data; an adder circuit that adds together the respective plural-bit digital data outputted from the weighting circuit, so as to output added digital data; and a converter circuit that converts the added digital data into bitstream data.

The "bitstream data" is pulse-density-modulated (PDM) data and has a logical value "1" or "0" at each of time slots corresponding to a predetermined bit rate. A plurality of bitstream data to be mixed are weighted for conversion into respective plural-bit digital data. That is, by being weighted with plural-bit digital coefficients of optionally selected values, the bitstream data to be mixed are converted into respective plural-bit digital data, i.e., data in PCM representation (pulse-code-modulated data). The weighting digital coefficients perform not only a function of converting the bitstream data into PCM data but also a function of setting a desired mixing ratio. Thus, the weighting degrees for the individual bitstream data may be variably set as desired. Then, the converted PCM data are added together, and the resultant added PCM data is reconverted into bitstream data (PDM data). In the above-mentioned manner, the plurality of bitstream data are mixed together through full-digital processing without having to use analog circuitry, and the mixed result is provided as one bitstream data. The converter circuit for converting the PCM data into the bitstream data (PDM data) may comprise a ΔΣ (delta sigma) modulator. The delta sigma modulator includes an integrator circuit in its input section, which is advantageously capable of removing shaping noise components from the original bitstream data (PDM data).

The mixing device according to the present invention is applicable not only to mixing between bitstream data but also to mixing between bitstream data and PCM data.

Namely, the mixing device of the present invention may comprises: a weighting circuit that receives bitstream data of a predetermined bit rate and weights the bitstream data for conversion thereof into plural-bit digital data; a PCM data supply circuit that supplies PCM digital data of a sampling rate corresponding to the bit rate; an adder circuit that adds together the digital data outputted from the weighting circuit and the digital data supplied from the PCM data supply circuit, so as to output added digital data; and a converter circuit that converts the added digital data, outputted from the adder circuit, into bitstream data, whereby the bit stream data outputted from the converter circuit is a mixture of the bitstream data and the PCM digital data.

By inclusion of the above-mentioned mixing device, it is possible to provide a coding device which is capable of mixing a plurality of analog signals and coding the mixed result without having to use analog circuitry. Namely, the coding device of the present invention comprises: a first converter circuit that converts the analog signals into respective bitstream data; a weighting circuit that weights the respective bitstream data for conversion thereof into respective plural-bit digital data; an adder circuit that adds together the respective plural-bit digital data outputted from the weighting circuit, so as to output added digital data; a second converter circuit that converts the added digital data, outputted from the adder circuit, into bitstream data; and a PCM conversion circuit that converts the bitstream data, outputted from the second converter circuit, into PCM data of a predetermined sampling rate.

Further, the present invention provides a coder-decoder (CODEC) device for receiving an analog signal and a digital PCM signal and outputting a mixture of the received analog signal and digital PCM signal, which comprises: a first converter circuit that converts the analog signal into bitstream data of a predetermined bit rate; a weighting circuit that weights the bitstream data, outputted from the first converter circuit, for conversion thereof into plural-bit digital data; an interpolator circuit that oversamples the received PCM signal until a sampling rate corresponding to the bit rate is reached and then interpolates between digital PCM data resultant from oversampling of the PCM signal; an adder circuit that adds together the plural-bit digital data outputted from the weighting circuit and digital PCM data outputted from the interpolator circuit, so as to output added digital data; a second converter circuit that converts the added digital data, outputted from the adder circuit, into bitstream data; and a PCM conversion circuit that converts the bitstream data, outputted from the second converter circuit, into PCM data of a predetermined sampling rate.

With such an arrangement, a mixture of the received analog signal and digital PCM signal is provided, as data in PCM representation, by the PCM conversion circuit. There may also be provided an analog low-pass filter that receives the bitstream data from the second converter circuit and provide analog data indicative of a mixture of the received analog data and digital PCM signal.

The present invention also provides an audio signal interface device which comprises: a supply circuit that supplies predetermined clock signals; a converter circuit that converts analog audio signals of plural channels into respective one-bit bitstream data at a bit rate based on the clock signals; and a multiplexer circuit that time-divisionally multiplexes the respective one-bit bitstream data of the individual channels on the basis of the clock signals in such a manner that the analog audio signals of the plural channels are converted into one-bit multiplexed bitstream data. The converter circuit may comprise a delta sigma modulator.

In such an arrangement, analog audio signals of plural channels, such as analog audio signals of left and right channels in a stereophonic system, are input and converted into respective one-bit bitstream data. Then, the respective one-bit bitstream data of the individual channels are time-divisionally multiplexed to provide one-bit multiplexed bitstream data. Thus, no particular processes for synchronizing, packeting, decoding purposes are required, which can greatly simplify the construction of an interface for receiving analog audio signal of plural channels. The one-bit multiplexed bitstream data is demultiplexed in a device (e.g., personal computer) utilizing the interface device and then subjected to a decimation process to be coded into plural-bit PCM data.

The present invention also provides an audio signal mixing device which comprises: a supply circuit that supplies predetermined clock signals; at least two audio signal interfaces, each of said audio signal interfaces including a first converter circuit that converts audio signals of plural channels into respective one-bit bitstream data at a bit rate based on the clock signals, and a multiplexer circuit that time-divisionally multiplexes the respective one-bit bitstream data of the plural channels on the basis of the clock signals in such a manner that the audio signals of the plural channels are converted into one-bit multiplexed bitstream data; a weighting circuit that weights the multiplexed bitstream data, outputted from each of the audio signal interfaces, for conversion into plural-bit digital data; an adder circuit that adds together the plural-bit digital data outputted from the weighting circuit, so as to output added digital data; and a second converter circuit that converts the added digital data, outputted from the adder circuit, into bitstream data, so as to output single time-divisionally multiplexed bitstream data resultant from addition by the adder circuit.

With such an arrangement, audio signals of plural channels, such as audio signals of left and right channels in a stereophonic system, are converted into one-bit multiplexed bitstream data in each of the audio signal interfaces. The multiplexed bitstream data from the audio signal interfaces are then digitally weighted and the resultant weighted data are added together on a channel-by-channel basis to provide single time-divisionally multiplexed bitstream data. Thus, the circuit structure can be extremely simplified. Besides, because all necessary processes are automatically synchronized on the basis of a common clock signal, no particular synchronizing circuit is required, which thus simplifies the overall circuitry structure. Further, because the signals and data the invention are all processed in full digital form, they are quite insusceptible to noise and practically no signal deterioration occurs even where a plurality of mixing circuit are connected in a multi-stage fashion.

BRIEF DESCRIPTION OF THE DRAWINGS

For better understanding of the above and other features of the present invention, the preferred embodiments of the invention will be described in greater detail below with reference to the accompanying drawings, in which.

DETAILED DESCRIPTION OF THE PREFERRED EMBODIMENTS

Figure 1:
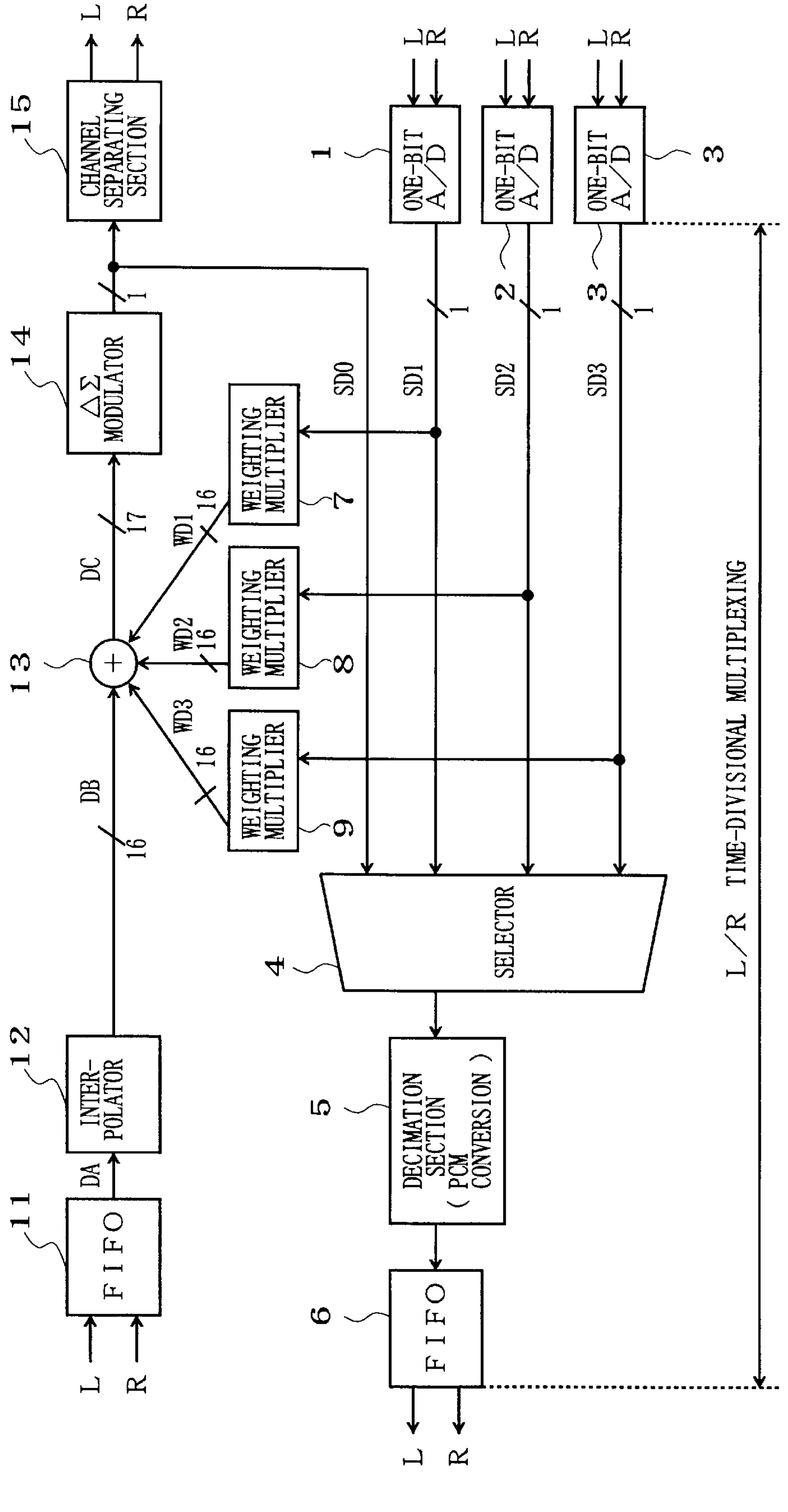
FIG. 1 is a block diagram illustrating a general configuration of a CODEC (Coder-Decoder) according to an embodiment of the present invention.

FIG. 1 is a block diagram illustrating a general configuration of a CODEC (Coder-Decoder) according to an embodiment of the present invention. This CODEC is connected to or incorporated in a personal computer (not shown), and the personal computer executes various signal processing, such as A/D and D/A conversions, that is necessary for signal communication with an external analog signal system. The CODEC also has a function to perform mixing between a plurality of signals supplied from the outside or between these externally supplied signals and a signal supplied by the personal computer, and is capable of supplying the resultant mixed signal to the outside or to the personal computer. The general configuration of the CODEC will be described below with reference to FIG. 1.

In FIG. 1, reference numerals 1 to 3 each denote a one-bit A/D converter using a ΔΣ (delta sigma) modulator of the analog input type, and left-channel (L) and right-channel (R) analog signals picked up by a microphone or the like are fed to each of the A/D converters 1 to 3. By subjecting the left-channel (L) and right-channel (R) analog signals to a delta sigma modulation on the time-divisional basis, the A/D converters 1 to 3 output bitstream data SD1–SD3.

Here, the bitstream data SD1–SD3 are each a train of one-bit pulse data that are pulse-density-modulated in accordance with an amplitude level of a corresponding original analog signal and are output at a bit rate much higher than the frequency band (audio frequency) of the original analog signal. Further, each of the A/D converters 1 to 3 outputs data, of the left and right channels, of the bitstream data in an alternate fashion (e.g., in order of "left-channel data", "right-channel data", "left-channel data", and so forth) on the time divisional basis, and the output data from the A/D converter are then passed to a succeeding circuit on a one-bit signal line. The time-divisional control for the individual channels is performed in every signal processing system within a region denoted in FIG. 1 at "L/R TIME-DIVISIONAL MULTIPLEXING".

Reference numeral 4 denotes a selector, which, on the basis of an instruction given from the personal computer, selects any one of the bitstream data SD1–SD3 and later-described bitstream data SD0.

Reference numeral 5 denotes a decimation section, which converts the bitstream data, fed via the selector 4, into PCM data of a given sampling frequency (e.g., 40 kHz). More specifically, a digital low-pass filter is provided at the input of the decimation section 5, and the bitstream data are passed through the low-pass filter so as to eliminate frequency components two or more times as high as the above-noted sampling frequency, i.e., components that would cause aliasing noise. Output signals from the low-pass filter are subjected to a thinning-out process to produce PCM data corresponding to the above-noted sampling frequency.

Reference numeral 6 denotes a FIFO (First-In-First-Out) buffer for sequentially accumulating the PCM data output from the decimation section 5. Each time a predetermined number of the PCM data are accumulated in the FIFO 6, these data are transferred for recording onto a hard disk of the personal computer.

Reference numeral 11 denotes another FIFO buffer for temporarily storing PCM data from the personal computer. Namely, left-channel and right-channel PCM data fed from the personal computer are sequentially accumulated in this FIFO buffer 11, and the thus-accumulated PCM data are then sequentially read out in response to sampling clock pulses of a given frequency (e.g., 40 kHz) and successively output as PCM data DA.

Reference numeral 12 denotes an interpolator, which interpolates between the PCM data DA sequentially output from the FIFO buffer 11 to produce 16-bit PCM data DB. The 16-bit PCM data DB are then output from the interpolator 12 at a same sampling rate equal to the bit rate of the bitstream data SD1–SD3.

An adder 13 and weighting multipliers 7 to 9 are provided for the mixing between the above-noted bitstream data SD1–SD3 or for the mixing between the bitstream data SD1–SD3 and the PCM data DB from the interpolator 12.

Each of the weighting multipliers 7 to 9 multiplies the corresponding bitstream data SD1–SD3 by a unique weighting coefficient. At time intervals corresponding to the bit rate of the bitstream data SD1–SD3, each of the weighting multipliers 7 to 9 examines the corresponding bitstream data SD1–SD3 for presence/absence of a pulse in the stream (in the bitstream data, a logical value "1" represents presence of a pulse while a logical value "0" represents absence of a pulse), and outputs PCM data WD1–WD3 in accordance with the examination results. For example, weighting coefficient n is preset to the weighting multiplier 7, so that the multiplier 7 outputs "+n" as PCM data WD1 at a point when the data of the bitstream is "1", but outputs "−n" at a point when the data of the bitstream is "0". The other two weighting multipliers 8 and 9 operate like the above-mentioned weighting multiplier 7. Each weighting coefficient determines a mixing ratio among the bitstream data SD1 to SD3. Different weighting coefficients may also be allocated to the left and right channels.

The weighting multipliers 7 to 9 output the PCM data WD1 to WD3 at the same timing when the interpolator 12 outputs the PCM data DB. The adder 13 adds together the PCM data from the weighting multipliers 7 to 9 (and the interpolator 12 when it outputs any PCM data), and provides the addition result as 17-bit PCM data DC.

Figure 2:
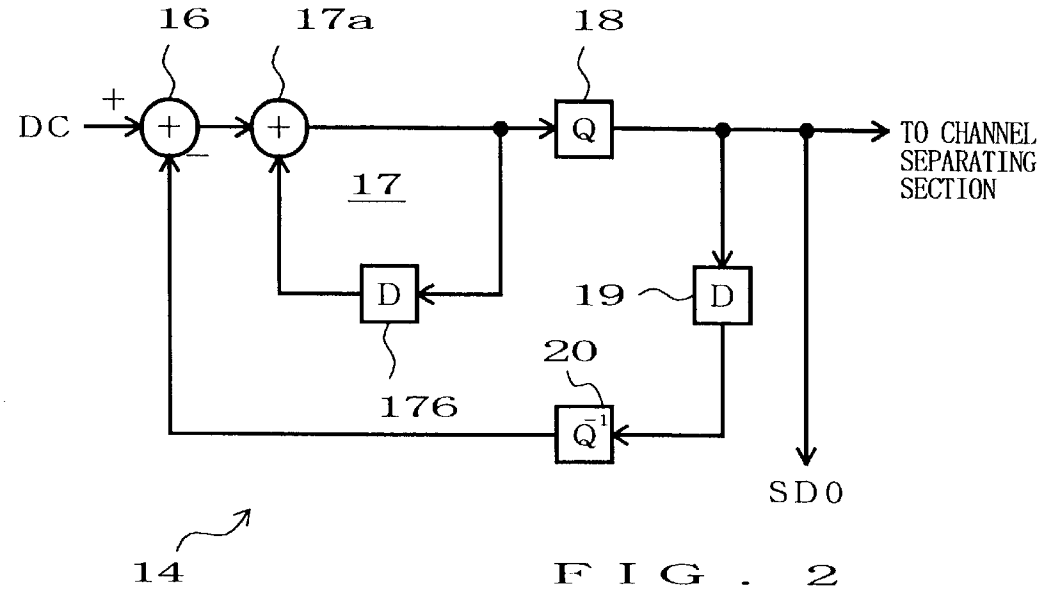
FIG. 2 is a block diagram illustrating a structural example of a delta sigma modulator shown in FIG. 1.

Reference numeral 14 denotes a ΔΣ (delta sigma) modulator of the digital input type, which performs a "delta sigma modulation" (ΔΣ modulation) on the PCM data DC output from the adder 13 so as to output bitstream data SD0 having the same bit rate as the above-noted bit stream data SD1–SD3. FIG. 2 illustrates a structural example of the delta sigma modulator 14. The illustrated example in FIG. 2 is a first-order delta sigma modulator of the full digital type, which comprises looped arrangements of a subtracter 16, an integrator 17 including an adder 17*a* and a delay element 17*b*, a quantizer 18 of the one-bit output type (i.e., digital comparator), a delay element 19, and a reversed quantizer (in other words, an encoder of the one-input/multiple-output type) 20. However, it should be obvious to those skilled in the art that a higher-order delta sigma modulator may be used as the modulator 14 of FIG. 2. The delay elements 17*b* and 19 are of the two-stage type to allow time divisional processing between the left and right channels.

Reference numeral 15 denotes a channel separating section, which includes a circuit for demultiplexing the bitstream data fed from the delta sigma modulator 14 so as to separate them into data of the left channel and data for the right channel, and analog low-pass filters provided in corresponding relation to the left and right channels so as to eliminate high-frequency components from the individual separated bitstream data.

Description on Operation of the Preferred Embodiment

The primary feature of the preferred embodiment resides in the process of mixing a plurality of bitstream data which is executed by the weighting multipliers 7 to 9, adder 13 and delta sigma modulator 14. Another feature of the preferred embodiment resides in the process of mixing the bit stream data and PCM data which is executed by the above-noted components 7 to 9, 13 and 14 and the interpolator 12.

FIG. 3 is explanatory of exemplary operations performed during the characteristic mixing process. More specifically, FIGS. 3A to 3G are diagrams showing the operations to mix PCM data reproduced from the hard disk of the personal computer and signals externally input via the one-bit A/D converters 1 and 2 and then return the mixed result to the personal computer for recording on the hard disk; in other words, they show example waveforms observed in various sections of the CODEC during so-called "overdubbing" (multiplexed recording). The following paragraphs describe the operation of the preferred embodiment with reference to FIG. 3.

Figure 3A:
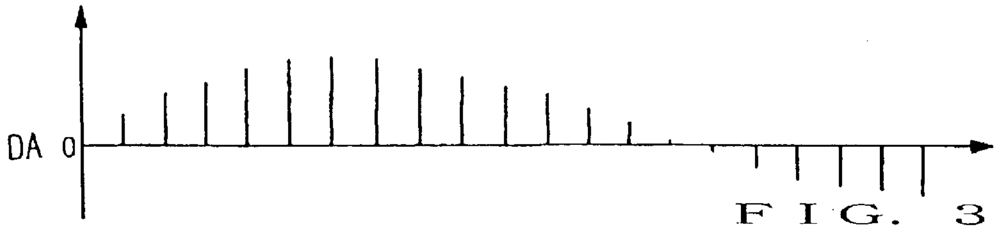
FIGS. 3A to 3G are waveform diagrams explanatory of exemplary operation of the embodiment of FIG. 1.
Figure 3B:
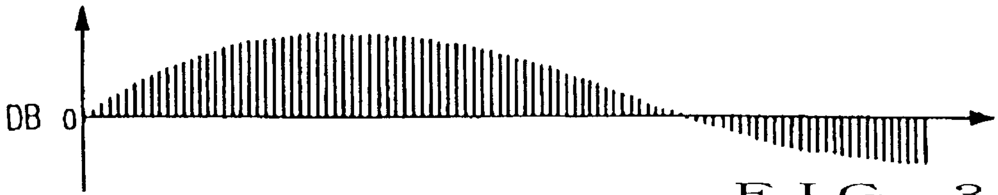

Each time a predetermined empty space is produced in the FIFO buffer 11 during the overdubbing, a predetermined number of left-channel and right-channel PCM data are read out from the hard disk of the personal computer and then accumulated in the empty space of the FIFO buffer 11. The accumulated PCM data are successively output from the FIFO buffer 11 in chronological order at a predetermined sampling rate. FIG. 3A shows PCM data DA thus sequentially output from the FIFO buffer 11. Although, in effect, PCM data DA of the left and right channels are output from the FIFO buffer 11, those only for one of the channels are shown to simplify the illustration in FIG. 3A. Likewise, PCM data only for one of the channels are shown in FIGS. 3B to 3G.

The PCM data from the FIFO buffer 11 are fed to the interpolator 12 for interpolation on a channel-by-channel basis. As a result, there are obtained oversampled PCM data DB as illustratively shown in FIG. 3B, which are then passed to the adder 13.

Figure 3C:
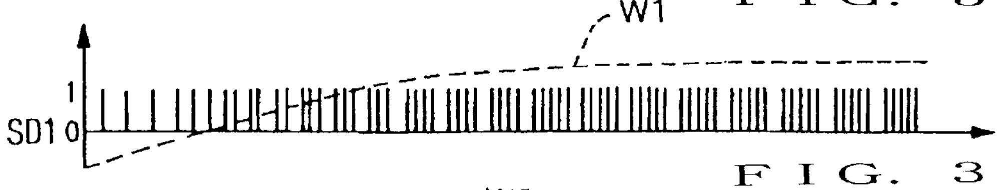
Figure 3D:
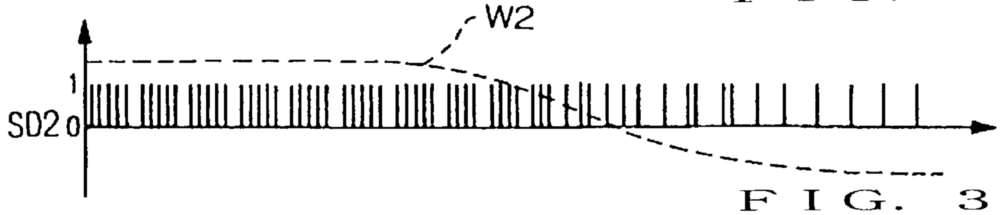

In the meantime, analog signals of the left and right channels are picked up by the microphone and introduced into the one-bit A/D converters 1 and 2. Thus, a delta sigma modulation is performed on these analog signals by means of the A/D converters 1 and 2, so that bitstream data SD1 and SD2 are output from the A/D converters at a predetermined bit rate. Pulse trains shown in FIGS. 3C and 3D represent such bitstream data SD1 and SD2 thus output from the A/D converters 1 and 2. Waveforms W1 and W2 denoted by broken line are original analog signal waveforms corresponding to the bitstream data SD1 and SD2. The bitstream data SD1 and SD2 are each output with a time density modulated with the corresponding original analog signal.

Figure 3E:
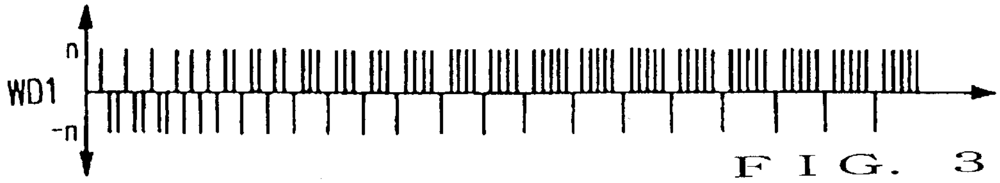
Figure 3F:
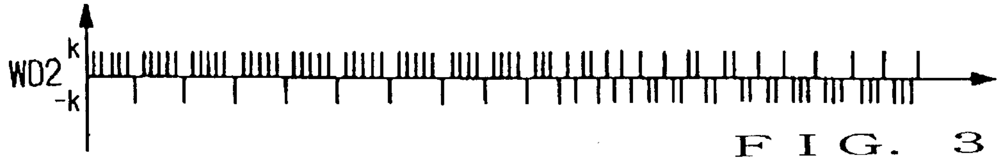
Figure 3G:
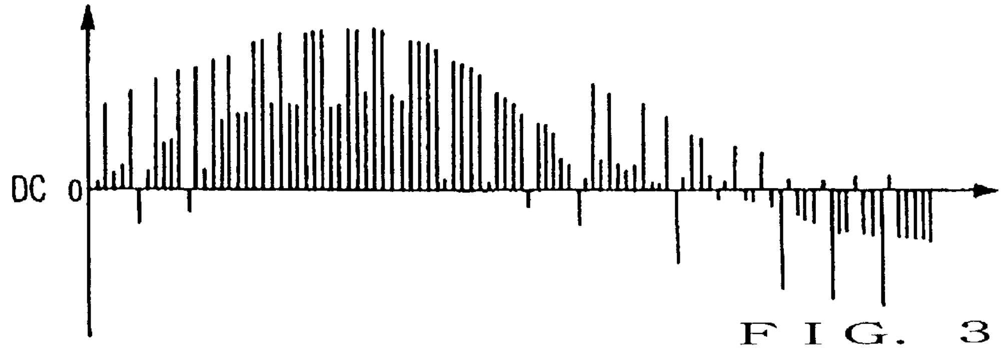

The bitstream data SD1 and SD2 are imparted respective weighting coefficients n and k by the weighting multipliers 7 and 8. Resultant weighted PCM data WD1 and WD2 are then passed to the adder 13. FIGS. 3E and 3F illustratively show such PCM data WD1 and WD2. The weighting coefficients n and k are preset in the weighting multipliers 7 and 8 on the basis of instructions from the personal computer. However, the weighting coefficients n and k may of course be determined depending on a desired mixing ratio manually set by the user. Further, an additional weighting multiplier may be provided which weights PCM data DB from the interpolator 12 with a suitable coefficient.

In the above-mentioned manner, the interpolator 12 outputs PCM data DB while the weighting multipliers 7 and 8 output PCM data WD1 and WD2, respectively, and these output data are passed to the adder 13. Thus, the adder 13 mixes these output data so as to yield PCM data DC as illustratively shown in FIG. 3G.

The PCM data DC, a mixture of the three kinds of PCM data DB, WD1 and WD2, is fed to the delta sigma modulator 14 for a delta sigma modulation. As a consequence, there is obtained a PDM pulse train corresponding to an analog signal waveform that is a sum of the original analog signal waveform corresponding to the PCM data DB and the analog signal waveforms corresponding to the PCM data WD1 and WD2, and the PDM pulse train is output from the delta sigma modulator 14 as bitstream data SD0. The following paragraphs describe in detail signal processing executed by the delta sigma modulator 14.

The PCM data WD1 and WD2 contained in the PCM data DC are the result of weighting the bitstream data SD1 and SD2, pulse-density-modulated on the basis of the respective input analog signal waveforms W1 and W2, with predetermined amplitude values n and k. Here, the bitstream data SD1 and SD2 comprise spectra of the original analog signal waveforms W1 and W2, and also contain, in a frequency band area of several megahertz (MHz), noise components resulting from the pulse density modulation of the original analog signal waveforms W1 and W2 (these noise components will be hereinafter called "shaping noise"). The PCM data WD1 comprises a spectrum of a waveform n·W1 obtained by multiplying the original analog signal waveform W1 by coefficient n, and shaping noise. Similarly, the PCM data WD2 comprises a spectrum of a waveform k·W2 obtained by multiplying the original analog signal waveform W2 by coefficient k, and shaping noise.

Such PCM data WD1 and WD2, containing shaping noise in addition to spectra corresponding to the respective original analog signal waveforms, are fed, along with the PCM data DB, to the delta sigma modulator 14 which includes an integrator in its input section as illustratively shown in FIG. 2. Therefore, if the PCM data WD1 and WD2 contain shaping noise resulting from the pulse density modulation, such shaping noise will be removed via the integrator. Consequently, when the pulse-density-modulated PCM data WD1 and WD2 are fed to the delta sigma modulator 14, the modulator 14 can provide PCM data, which is free of shaping noise and contains only spectral components corresponding to the analog signal waveforms n·W1 and k·W2, in the same condition as originally supplied.

By virtue of such behavior, the delta sigma modulator 14 can output bitstream data SD0 that has been pulse-density-modulated by an analog signal waveform comprising a sum of the analog signal waveforms n·W1 and k·W2 corresponding to the PCM data DB.

The bitstream data SD0 from the delta sigma modulator 14 is passed to the channel separating section 15, where it is separated into data of the left channel and data of the right channel. Each of the data thus separated by the channel separating section 15 is then passed through an analog low-pass filter for removal of high-frequency components therefrom, and a resultant analog signal is audibly reproduced or sounded through a speaker and the like for the corresponding channel.

In the overdubbing mode, on the other hand, the selector 4 of FIG. 1 selects the output of the delta sigma modulator 14, so that the bitstream data SD0 from the modulator 14 is routed via the selector 4 to the decimation section 5. In the decimation section 5, the bitstream data SD0 is subjected to a low-pass filtering process for removal of aliasing noise therefrom and to a thinning-out process corresponding to a predetermined sampling frequency. Then, PCM data resultant from these processes is transferred via the FIFO buffer 6 to the personal computer for recording onto the hard disk.

In the above-mentioned manner, there has been generated PCM data of an analog signal waveform that is a mixture of the analog signal waveform corresponding to PCM data read out from the hard disk and externally supplied analog signal waveforms W1 and W2, and the thus generated PCM data has been recorded onto the hard disk.

Whereas the overdubbing operation of the preferred embodiment has been described, normal mixing is, of course, also possible. That is, only the bitstream data SD1–SD3 derived from the externally supplied analog signals may be mixed in such a manner that the resultant bitstream data SD0 is transferred to the personal computer. The operation in this modification is similar to the foregoing except that no PCM data DB is fed to the adder 13, and therefore it will not be explained here to avoid unnecessary duplication.

Whereas the preferred embodiment has been described above in relation to the case where the principle of the present invention is applied to a CODEC, the application of the present invention is of course not limited to CODECs alone, and various modifications are possible without departing from the essential features of the invention.

As an example, the mixing circuit, comprising the weighting multipliers 7 to 9, adder 13 and delta sigma modulator 14 as shown in FIG. 1, may be provided separately from the CODEC. Further, the interpolator 12 may be added to these components so as to provide a mixing circuit that mixes plural externally supplied PCM data and bitstream data at a time. In this case, the number of PCM data and bitstream data to be mixed may be determined optionally; for instance, one bitstream data and one PCM data may be mixed. Furthermore, whereas the preferred embodiment has been described as generating PCM data by adding together a plurality of PCM data by means of the weighting multipliers 7 to 9 and adder 13, the components for generating the PCM data are not limited to the mentioned. The present invention may employ any other means as long as they can produce PCM data containing spectra of original analog signals found in the individual bitstream data (i.e., spectra obtained by removing shaping noise from the bitstream data).

The present invention, as has been described so far, can execute mixing between a plurality of bitstream data or between bitstream data and PCM data without using analog circuitry, and hence affords the benefit of effectively preventing unwanted noise, waveform distortion, increase in electric power consumption, increase in the size of the device, etc.

Description on Another Embodiment

Figure 4:
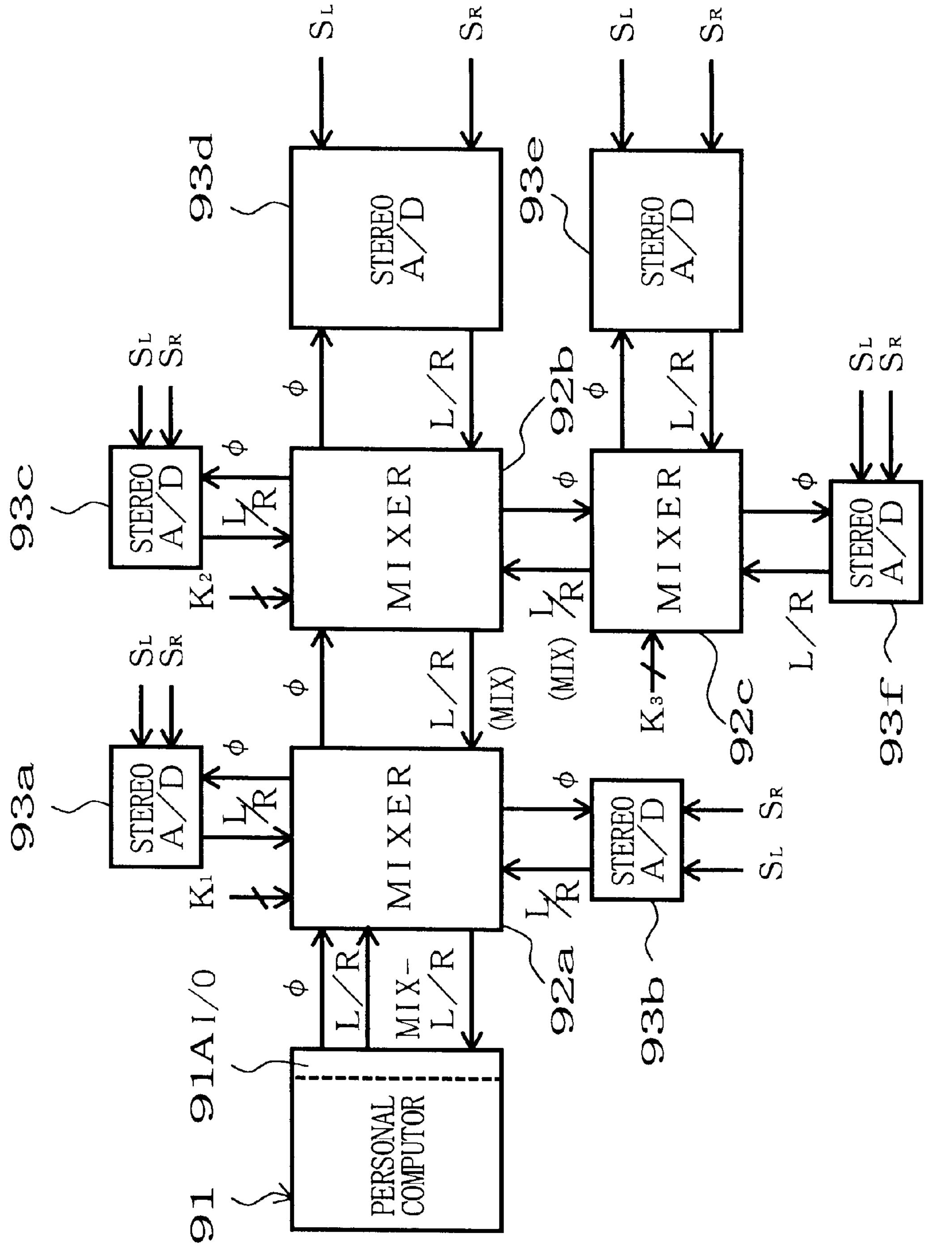
FIG. 4 is a block diagram illustrating an audio editing system according to another embodiment of the present invention.

FIG. 4 is a block diagram illustrating an audio editing system employing a mixer according to another embodiment of the present invention.

The audio editing system of FIG. 4 is constructed as a so-called "overdubbing system", which comprises mixers 92*a*, 92*b* and 92*c*, connected in series or in a multi-stage fashion, for mixing a plurality of multiplexed audio data L/R to produce multiplexed mixing data MIX-L/R. The multiplexed mixing data MIX-L/R is written into a personal computer 91. The mixer 92*a* receives multiplexed audio data L/R from the personal computer 91, stereo A/D converters 93*a* and 93*b* and mixer 92*b* and mixes these audio data L/R so as to supply the resultant mixed data to the personal computer 91. The mixer 92*b* receives multiplexed audio data L/R from stereo A/D converters 93*c* and 93*d* and mixer 92*c* and mixes these audio data L/R so as to supply the resultant mixed data to the mixer 92*a*. Similarly, the mixer 92*c* receives multiplexed audio data L/R from stereo A/D converters 93*e* and 93*f* and mixes these audio data L/R so as to supply the resultant mixed data to the mixer 91*b*. In this way, the multiplexed audio data L/R output from the personal computer 91 is multiplexed with the multiplexed audio data L/R from the stereo A/D converters 93*a* to 93*f* and then written again into the personal computer 91.

Figure 5:
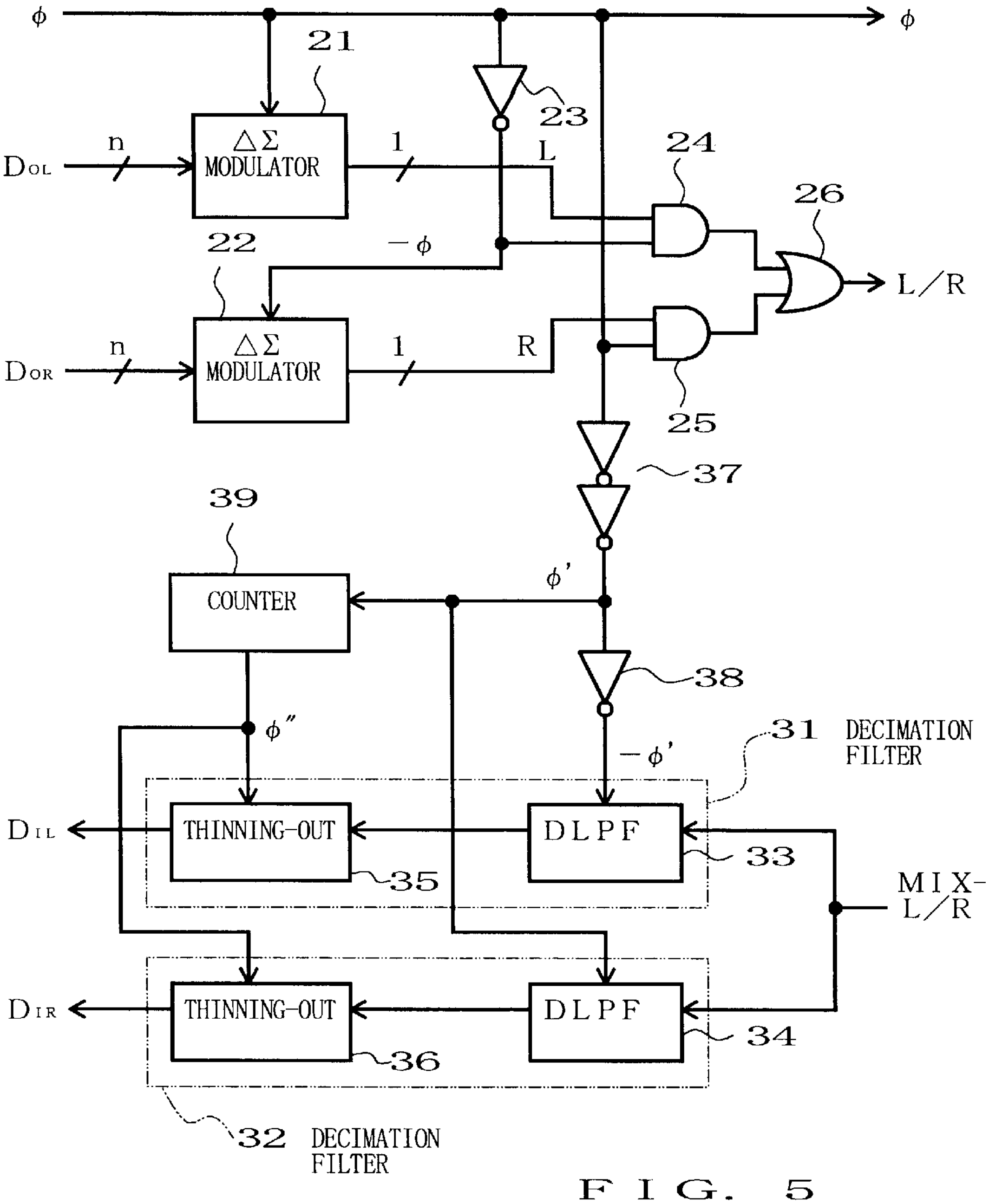
FIG. 5 is a block diagram illustrating a structural example of an audio input/output section of a personal computer in the system of FIG. 4.

Audio input/output section 91AI/O of the personal computer 91 is constructed, for example, in the manner as shown in FIG. 5.

In response to a clock pulse signal $\phi$, a delta sigma modulator 21 of the full digital type performs a delta sigma modulation on left-channel PCM data $D_{OL}$ (digital audio data of a plurality of bits n) generated within the personal computer 91, so as to convert the data into bitstream data of one bit. Similarly, in response to an inverted clock pulse signal $-\phi$ from an inverter 23, a delta sigma modulator 22 of the full digital type performs a delta sigma modulation on right-channel PCM data $D_{OR}$ (digital audio data of a plurality of bits n) generated within the personal computer 91, so as to convert the data into bitstream data of one bit. The audio data of the left and right channels, each comprising one-bit bitstream data, are fed to one input of AND gates 24 and 25, respectively. In response to the clock pulses $-\phi$ and $\phi$ applied to the other input, the AND gates 24 and 25 allow the audio data L and R to pass therethrough in an alternate fashion. The audio data L and R from the AND gates 24 and 25 are then synthesized via an OR gate 26 into one-bit multiplexed audio data L/R to be output from the audio input/output section 91AI/O.

Figure 6:
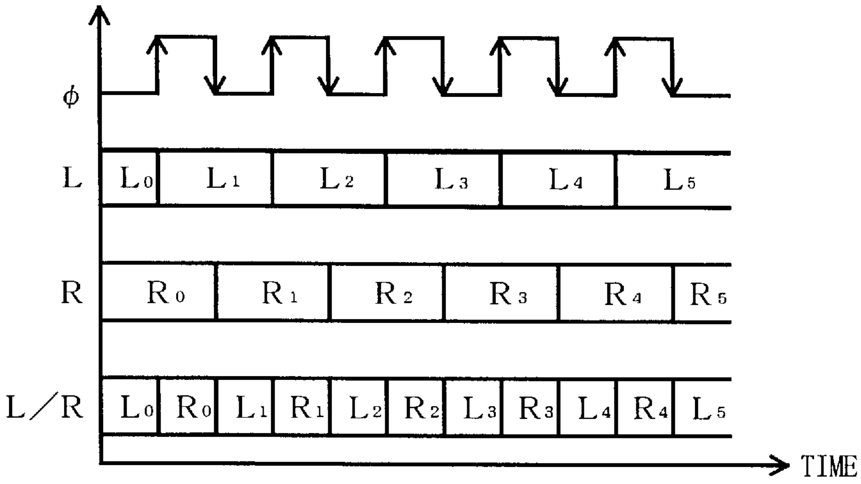
FIG. 6 is a timing chart explanatory of operation of the audio input/output section.

FIG. 6 is a timing chart explanatory of the operation of the audio input/output section 91AI/O.

The one-bit digital data L and R of the left and right channels are phase-shifted from each other by a half period of the clock pulse signal ϕ, so that by alternately selecting these data, multiplexed audio data L/R are obtained which switch between the left-channel data and the right-channel data in a cycle twice as high as that of the clock pulse signal ϕ. If the cycle of the clock pulse signal ϕ for the delta sigma modulators 21 and 22 is set to about 12 MHz, the phase difference between the left-channel data and right-channel data of the multiplexed audio data L/R is just about 40 ns which would never influence the auditory sense of human listeners.

Further, in FIG. 5, multiplexed mixing data MIX-L/R externally supplied to the personal computer 91 is passed to decimation filters 31 and 32. Each of the decimation filters 31 and 32 includes a digital low-pass filter (DLPF) 33 or 34 for removing aliasing noise from the audio data and converting the bitstream into multiple bit data, and a thinning-out section 35 or 36 for thinning out the data to lower the multiple bit data to a sampling frequency of PCM data. To slightly displace the sampling timing from that of the switching between the left and right channels, the clock pulse signal ϕ is delayed by a delay circuit 37 to provide a delayed clock signal ϕ' to the digital low-pass filter 34, and also the delayed clock signal ϕ' is inverted by an inverter 38 to provide an inverted delayed clock signal −ϕ' to the digital low-pass filter 33. In response to these clock signals ϕ' and −ϕ' the multiplexed left- and right-channel data are demultiplexed to be then fed to the digital low-pass filters 33 and 34. The delayed clock signal ϕ' is also frequency-divided via a counter 39 to the PCM sampling frequency to provide a frequency-divided clock signal ϕ" to the thinning-out sections 35 and 36.

Thus, the decimation filters 31 and 32 output n-bit PCM data $D_{IL}$ and $D_{IR}$ of the left and right channels, respectively, which are then fed to the personal computer 91. Since the input/output of the clock pulse signal ϕ between the personal computer 91 and external equipment, multiplexed audio data L/R and multiplexed mixing data MIX-L/R are all of one bit, the input/output of these signal and data can be effected using an analog audio input/output terminal provided in the personal computer 91.

Figure 7:
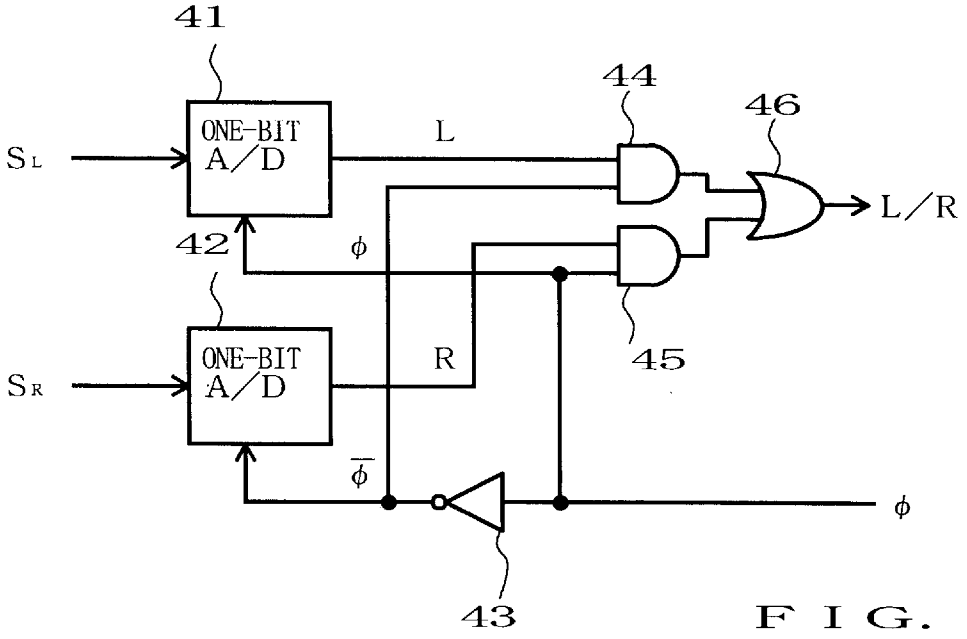
FIG. 7 is a block diagram illustrating a structural example of a stereo A/D converter in the system of FIG. 4.

The stereo A/D converters 93*a* to 93*f* are constructed in a similar manner to the output section of the personal computer 91, as illustratively shown in FIG. 7. Namely, analog audio signals $S_L$ and $S_R$ for left and right channels supplied from an audio source, such as a microphone, audio playback device, electronic musical instrument or mixer (not shown), are fed to one-bit A/D converters 41 and 42, respectively. In response a clock pulse signal ϕ, the one-bit AID converter 41, which comprises, for example, a delta sigma modulator of the analog input type, converts the analog audio signal $S_L$ into one-bit digital representation so as to output one-bit bitstream data. In response to an inverted clock pulse signal −ϕ from an inverter 43, the one-bit AID converter 42, which also comprises, for example, a delta sigma modulator of the analog input type, converts the analog audio signal $S_R$ into one-bit digital representation so as to output one-bit bitstream data. The resultant one-bit audio data L and R are passed to one input of AND gates 44 and 45, respectively. In response to the clock pulses −ϕ and ϕ applied to the o other input, the AND gates 44 and 45 allow the audio data L and R to pass therethrough in an alternate fashion. The audio data L and R from the AND gates 44 and 45 are then synthesized via an OR gate 46 into one-bit multiplexed audio data L/R.

Figure 8:
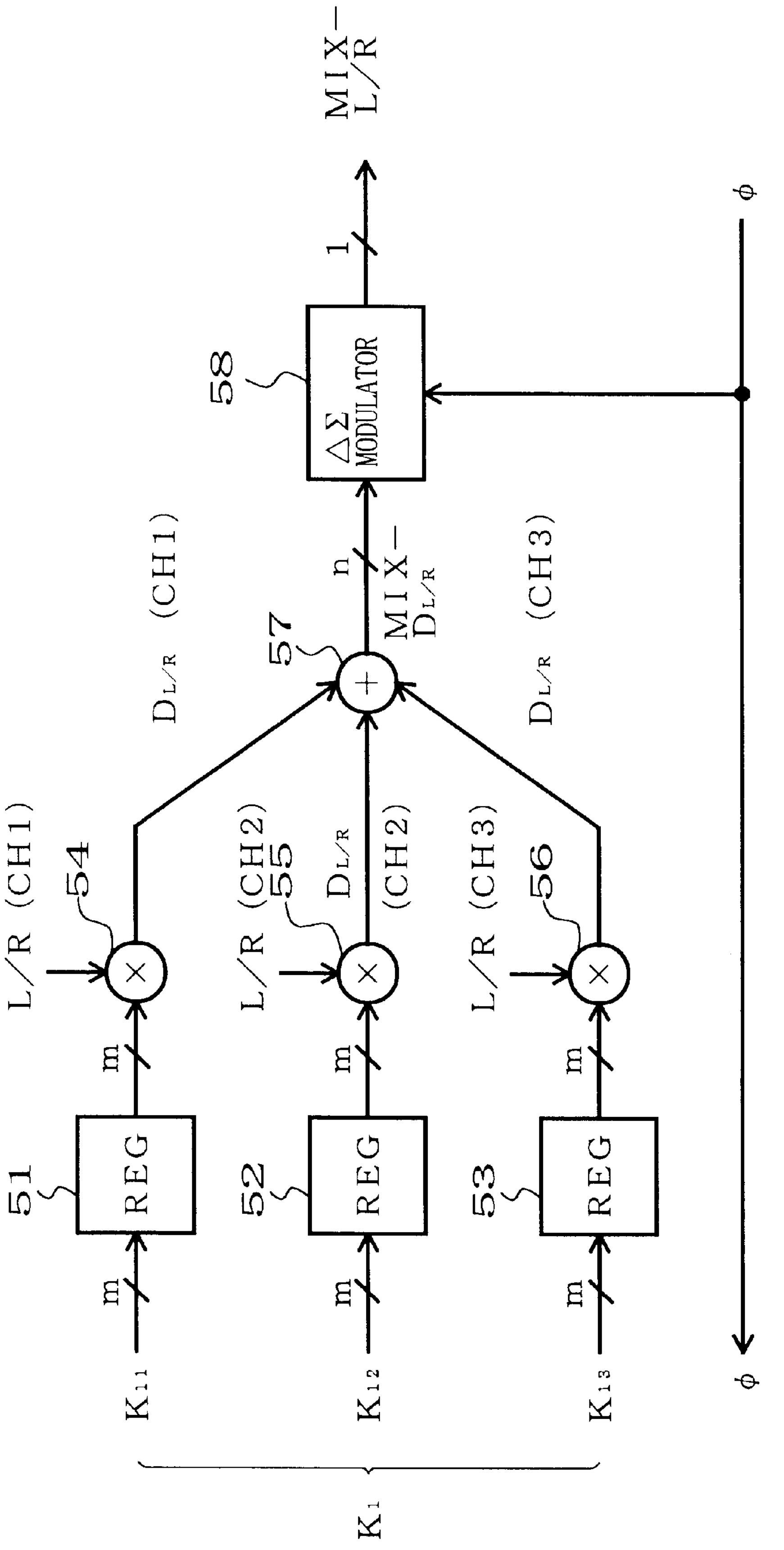
FIG. 8 is a block diagram illustrating a structural example of a mixer in the system of FIG. 4.

The mixer 92*a* of FIG. 4 is constructed in a manner as illustratively shown in FIG. 8—so are constructed the mixers 92*b* and 92*c* although not specifically shown.

Weighting coefficients $K_{11}$, $K_{12}$ and $K_{13}$ of plural bits m, which determine a mixing ratio between multiplexed audio data L/R to be input to the mixer, are preset in registers 51, 52 and 53, respectively, via user's operation. Weighting sections 54, 55 and 56 weight the multiplexed audio data L/R with the respective weighting coefficients $K_{11}$, $K_{12}$ and $K_{13}$ to provide plural-bit PCM data $D_{L/R}$.

Figure 9:
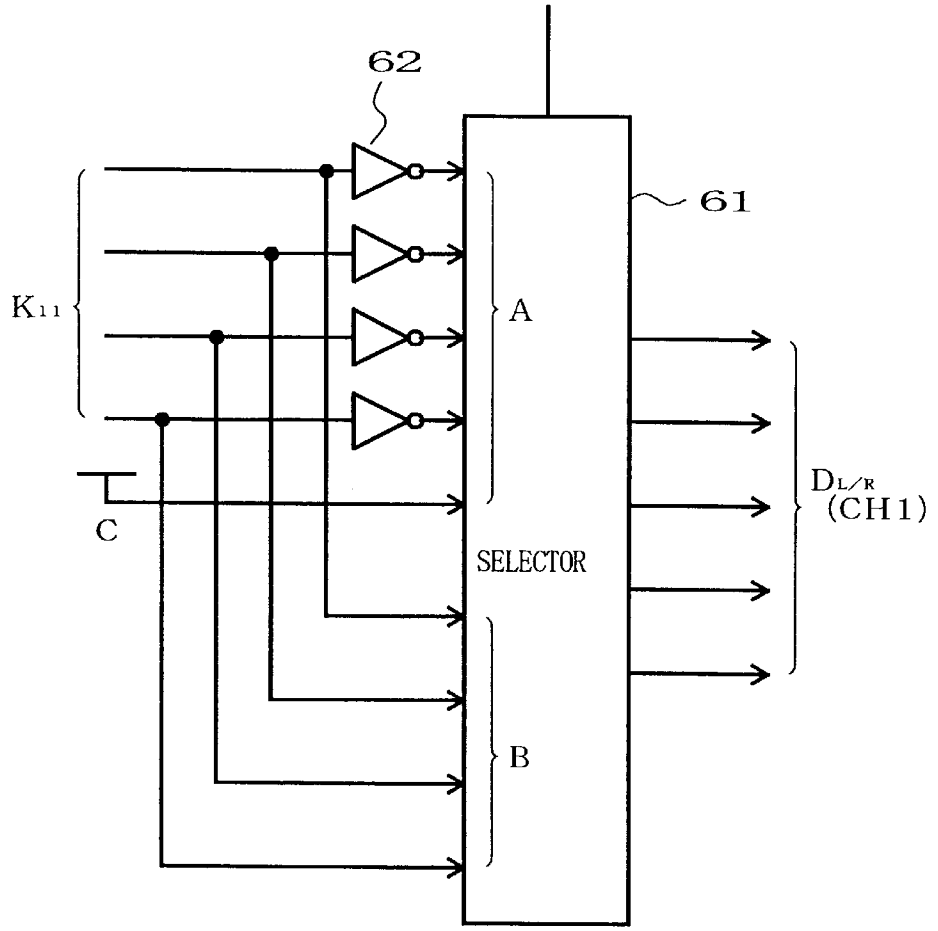
FIG. 9 is a block diagram illustrating a structural example of a weighting section in the mixer of FIG. 8.

Each of the weighting sections 54, 55 and 56 can be simply constructed of a selector 61 and an inverter 62, as illustratively shown in FIG. 9. If the weighting coefficient $K_{11}$ is of four bits, five-bit data comprising an inverted four-bit weighting coefficient $K_{11}$ from the inverter 62 plus one carry bit C (=1) attached to its uppermost bit, which is equal to a negative value obtained by multiplying the weighting coefficient $K_{11}$ by a value "−1", is fed to terminal A of the selector 61. The four-bit weighting coefficient $K_{11}$ itself is directly fed to terminal B of the selector 61 as a positive value. When the multiplexed audio data L/R applied as a switching input to the selector 61 is of a value "0", the negative value ($-K_{11}$) is selected as PCM data $D_{L/R}$, while when the multiplexed audio data L/R applied as a switching input to the selector 61 is of a value "1", the positive value ($K_{11}$) is selected as the PCM data $D_{L/R}$.

In FIG. 8, the PCM data $D_{L/R}$ from the weighting sections 54, 55 and 56 are added together by an adder 57 to provide n-bit PCM mixing data MIX-$D_{L/R}$ still maintained at an oversampling rate. This PCM mixing data MIX-$D_{L/R}$ is delivered to a delta sigma modulator 58 of the digital input type for a delta sigma modulation so as to provide one-bit multiplexed mixing data MIX-L/R.

Figure 10:
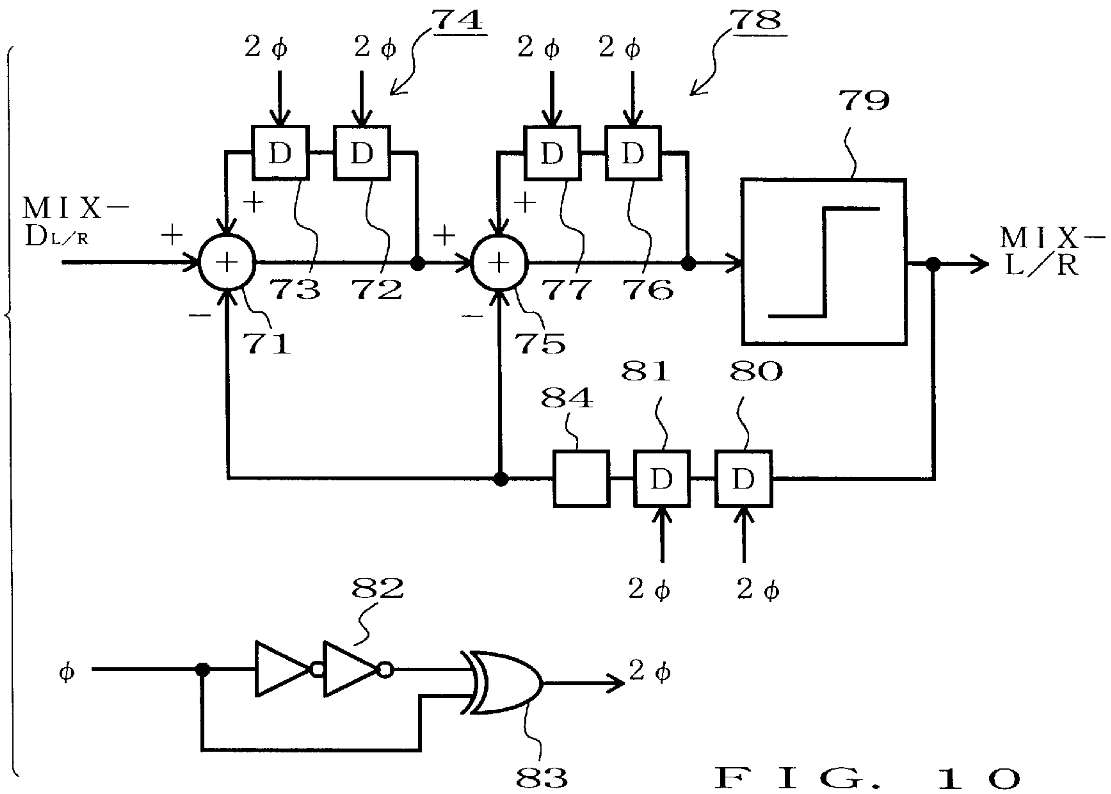
FIG. 10 is a block diagram illustrating a structural example of a delta sigma modulator in the mixer of FIG. 8.
Figure 11:
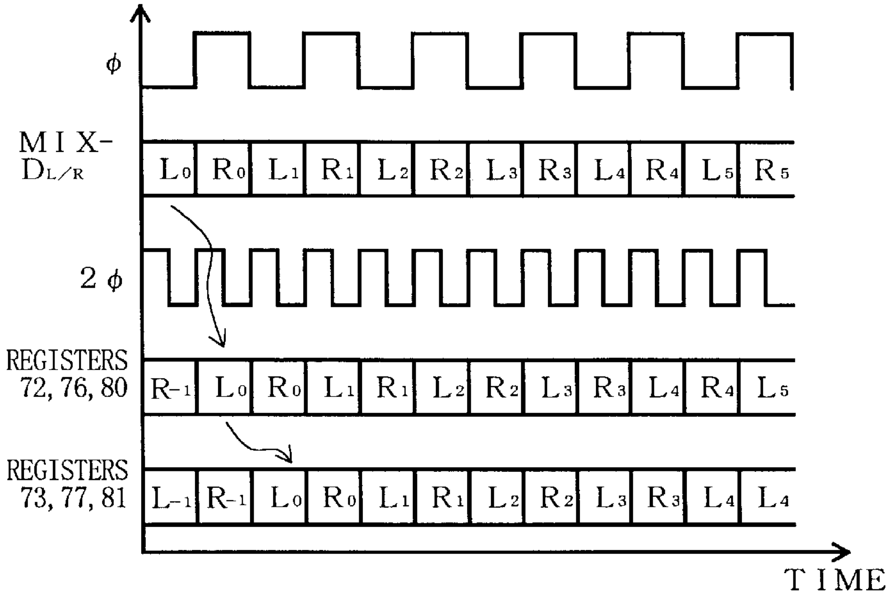
FIG. 11 is a timing chart explanatory of operation of the delta sigma modulator of FIG. 10.

Since the multiplexed mixing data MIX-L/R of the left and right channels appear in an alternate fashion, it is necessary that the delta sigma modulator 58 execute the delta sigma modulation separately for the left and right channels. To this end, the delta sigma modulator 58 may be constructed in a manner as shown in FIG. 10. The illustrated circuit in FIG. 10 is based on a conventionally-known second-order delta sigma modulator, which comprises: a first integrator 74 including an adder 71 and registers 72 and 73; a second integrator 78 including an adder 75 and registers 76 and 77; Cur a quantizer (or digital comparator) 79 for quantizing plural-bit digital data from the two integrator 74 and 78 into one-bit data; registers 80 and 81 for temporarily holding output data from the quantizer 79 for subsequent feedback to the adders 71 and 75; and a reversed quantizer 84. Thus, the registers 72, 73 and 76, 77 of the integrator 74 and 78 and feedback registers 80 and 81 are arranged as dual structures.

EX-OR gate 83 synthesizes the clock pulse signal ϕ and a delayed clock pulse signal generated by a delay circuit 82, so as to provide a clock pulse signal 2ϕ having a cycle twice as high as the clock pulse signal ϕ. By giving the clock pulse signal 2ϕ to the individual registers 72, 73, 76, 77, 80, 81, the input of the data MIX-$D_{L/R}$ of the individual channels coincides with the output of the data of the corresponding channels from the registers 73, 77 and 81 at a point later than the clock pulse signal 2ϕ exactly by one period of the clock pulse signal ϕ, so that independent delta sigma modulation can be executed for the left and right channels. Besides, no special processing is required for time-divisional multiplexing for the left and right channels.

The PCM mixing data MIX-$D_{L/R}$ fed to the delta sigma modulator 58, which is obtained by merely mixing delta-sigma-modulated signals while maintaining the oversampling rate, contains frequency components higher than the frequency of the original signals. However, the higher frequency components are automatically removed by the two integrators preceding the delta sigma modulator 58, and hence reproducibility of the original waveforms would not be impaired at all.

The most important aspect of the described system is that the personal computer 91 functions as a clock generation means and the generated clock pulse signal ϕ is fed, via the mixers 92*a* to 92*c*, to all of the mixers 92*a* to 92*c* and stereo A/D converters 93*a* to 93*f* in such a manner that all necessary processes are executed in response to the common clock pulse signal ϕ. With this arrangement, the mixers 92*a* to 92*c* and personal computer 91 need not conduct synchronizing operations separately for individual inputs.

Further, because multiplexed audio data L/R and multiplexed mixing data MIX-L/R handled in the system are all in digital form, these data L/R and MIX-L/R are not influenced by noise and no signal deterioration occurs in the system, which allow a plurality of mixers to be connected in a multi-stage fashion. Besides, because these data are bit stream signals, only one line has to be provided for input/output of data, in addition to a single line for clock pulse signals. This arrangement considerably reduces the necessary number of lines connecting various components of the system.

As has been described so far, the present invention is characterized in that a common clock pulse signal is fed to all the audio output sections for generating multiplexed audio data to be mixed and all the mixers in such a manner that delta sigma modulation and time-divisional multiplexing are executed in response to the common clock pulse signal. With such a characteristic arrangement, multiplexed audio data and multiplexed mixing data can all be synchronized, which eliminates a need for particular synchronizing operations for individual signals. This can greatly simplify the necessary circuit structure. Further, because multiplexed audio data and multiplexed mixing data handled in the invention are all in digital form, these data are quite insusceptible to noise and practically no signal deterioration occurs even where a plurality of mixers are connected in a multi-stage fashion.

What is claimed is:

1. An audio signal mixing device for mixing plural time-division multiplexed bitstream audio data of plural channels, said mixing device comprising:

a weighting circuit that weights the plural multiplexed bitstream audio data for conversion thereof into respective multiplexed plural-bit digital audio data;

an adder circuit that adds together the respective multiplexed plural-bit digital audio data outputted from said weighting circuit so as to output added multiplexed digital audio data; and a converter circuit that converts the added multiplexed digital audio data, outputted from said adder circuit, into a single time-divisionally multiplexed bitstream audio data.

2. A mixing device as recited in claim 1 wherein said converter circuit includes a delta sigma modulator circuit.

3. A mixing device as recited in claim 1 wherein said weighting circuit includes a multiplier circuit that multiplies the plural bitstream data by respective predetermined weighting coefficients.

4. A mixing device as recited in claim 3 wherein a value of the weighting coefficient can be optionally set for each of the plural bitstream data.

5. A mixing device as recited in claim 3 wherein said multiplier circuit multiplies the bitstream data by either of positive and negative weighting coefficients depending on whether a value of the bitstream data is 1 or 0.

6. A mixing device as recited in claim 5 wherein said multiplier circuit includes a selector circuit that selects either of predetermined positive and negative weighting coefficients depending on whether the value of the bitstream data is 1 or 0.

7. A mixing device as recited in claim 1 wherein said converter circuit includes an integrator circuit provided in an input section thereof.

8. A mixing device comprising:

a weighting circuit that receives bitstream audio data of a predetermined bit rate and weights the bitstream audio data for conversion thereof into plural-bit digital data, wherein said weighting circuit multiplies the bitstream audio data by either of predetermined positive and negative weighting coefficients depending on whether a value of the bitstream audio data is 1 or 0, and wherein said weighting circuit weights a plurality of the bitstream audio data for conversion thereof into respective plural-bit digital audio data;

a PCM audio data supply circuit that supplies PCM digital audio data of a sampling rate corresponding to said bit rate, wherein said PCM audio data supply circuit includes a circuit that receives PCM digital audio data of a given sampling rate, and an interpolator circuit that oversamples the PCM digital audio data until a sampling rate corresponding to said bit rate is reached and then interpolates between the oversampled PCM digital audio data;

an adder circuit that adds together the digital audio data outputted from said weighting circuit and the digital audio data supplied from said PCM audio data supply circuit, so as to output added digital audio data, and wherein said adder circuit adds together the respective plural-bit digital audio data and the PCM digital audio data supplied from said PCM audio data supply circuit; and a converter circuit that converts the added digital audio data, outputted from said adder circuit, into bitstream audio data, wherein said converter circuit includes a delta sigma modulator circuit, and whereby the bitstream audio data outputted from said converter circuit is a mixture of said bitstream audio data and said PCM digital audio data.

9. A coding device for receiving plural analog audio signals and mixing and coding the received analog audio signals, said coding device comprising:

a first converter circuit that converts the analog audio signals into respective multiplexed bitstream audio data;

a weighting circuit that weights the respective multiplexed bitstream audio data for conversion thereof into respective multiplexed plural-bit digital audio data;

an adder circuit that added together the respective multiplexed plural-bit digital audio data outputted from said weighting circuit, so as to output added multiplexed digital audio data;

a second converter circuit that converts the added multiplexed digital audio data outputted from said adder circuit, into a single time-divisionally multiplexed bitstream audio data; and a PCM conversion circuit that converts the single time-divisionally multiplexed bitstream audio data, outputted from said second converter circuit, into single time-divisionally multiplexed PCM audio data of a predetermined sampling rate.

10. A coding device as recited in claim 9 wherein said first converter circuit is a delta sigma modulator of an analog input type and said second converter circuit is a delta sigma modulator of a digital input type and wherein said PCM conversion circuit includes a decimation filter.

11. A coder-decoder device for receiving an analog audio signal and a digital PCM audio signal and outputting a mixture of the received analog audio signal and digital PCM audio signal, said decoding device comprising:

a first converter circuit that converts the analog audio signal into bitstream audio data of a predetermined bit rate;

a weighting circuit that weights the bitstream audio data, outputted from said first converter circuit, for conversion thereof into plural-bit digital audio data;

an interpolator circuit that oversamples the received PCM audio signal until a sampling rate corresponding to said bit rate is reached and then interpolates between digital PCM audio data resultant form oversampling of the PCM audio signal;

an adder circuit that adds together the plural-bit digital audio data outputted from said weighting circuit and digital PCM audio data outputted from said interpolator circuit, so as to output added digital audio data;

a second converter circuit that converts the added digital audio data, outputted from said adder circuit, into bitstream audio data; and a PCM conversion circuit that converts the bitstream audio data, outputted form said second converter circuit, into PCM audio data of a predetermined sampling rate.

12. A coder-decoder device as recited in claim 11 wherein said first converter circuit is a delta sigma modulator of an analog input type and said second converter circuit is a delta sigma modulator of a digital input type and wherein said PCM conversion circuit includes a decimation filter.

13. A coder-decoder device as recited in claim 11 wherein said first converter converts a plurality of the analog signals into respective bitstream data corresponding to the analog signals, said weighting circuit weights the respective bitstream data for conversion thereof into respective plural-bit digital data, and said adder circuit adds together the respective plural-bit digital data outputted from said weighting circuit and the digital PCM data outputted from said interpolator circuit.

14. A coder-decoder device as recited in claim 11 which further comprises an analog low-pass filter that receives the bit stream data from said second converter circuit, by means of which the bit stream data from said second converter circuit is converted into an analog signal.

15. A method for mixing multiplexed pulse-density-modulated audio data, said method comprising the steps of:

weighting the multiplexed pulse-density-modulated audio data with a predetermined digital coefficient to produce multiplexed plural-bit digital audio data corresponding to the multiplexed pulse-density-modulated audio data;

adding the multiplexed plural-bit digital audio data with other multiplexed plural-bit digital audio data to produce added multiplexed digital audio data; and performing a delta sigma modulation on the added multiplexed digital audio data to produce a single time-divisionally multiplexed pulse-density-modulated addition result audio data.

16. A method as recited in claim 15 which further includes a step of demodulating said pulse-density-modulated addition result data.

17. A method for mixing an analog audio signal and a digital audio signal, said method comprising the steps of:

receiving an analog audio signal to be mixed, and performing a predetermined modulation on the received analog audio signal to produce pulse-density-modulated audio data;

weighting the pulse-density-modulated audio data with a predetermined digital coefficient to produce plural-bit digital audio data corresponding to the pulse-density-modulated audio data;

receiving pulse-code-modulated digital audio data to be mixed;

adding the produced plural-bit digital audio data with the received pulse-code-modulated digital audio data to produce added digital audio data; and performing a delta sigma modulation on the added digital audio data to produce pulse-density-modulated addition result audio data.

18. A method as recited in claim 17 which further includes a step of demodulating said pulse-density-modulated addition result data.

19. A method for mixing plural analog audio signals, said method comprising the steps of:

receiving plural analog audio signals to be mixed, and performing a predetermined modulation on the received analog audio signals to produce plural multiplexed pulse-density-modulated audio data corresponding to the received analog audio signals respectively;

weighting the produced respective multiplexed pulse-density-modulated audio data with predetermined digital coefficients to produce multiplexed plural-bit digital audio data corresponding to the respective multiplexed pulse-density-modulated audio data;

adding together the produced multiplexed plural-bit digital audio data with the received pulse-code-modulated digital audio data to produce added multiplexed digital audio data; and performing a delta sigma modulation on the added multiplexed digital audio data to produce a single time-divisionally multiplexed pulse-density-modulated addition result audio data.

20. A method as recited in claim 19 which further includes a step of demodulating said pulse-density-modulated addition result data.

21. An audio signal mixing device comprising:

a supply circuit that supplies predetermined clock signals;

at least two audio signal interfaces, each of said audio signal interfaces including a first converter circuit that converts audio signals of plural channels into respective one-bit bitstream data at a bit rate based on the clock signals, and a multiplexer circuit that time-divisionally multiplexes the respective one-bit bitstream data of the plural channels on the basis of the clock signals in such a manner that the audio signals of the plural channels are converted into one-bit multiplexed bitstream data;

a weighting circuit that weights said multiplexed bitstream data, outputted from each of said audio signal interfaces, for conversion into plural-bit digital data;

an adder circuit that adds together the plural-bit digital data outputted from said weighting circuit, so as to output added digital data; and a second converter circuit that converts the added digital data, outputted from said adder circuit, into bitstream data, so as to output single time-divisionally multiplexed bitstream data resultant from addition by said adder circuit.

22. An audio signal mixing device as recited in claim 21 wherein said first converter circuit included in at least one of said audio signal interfaces is a delta sigma modulator that converts analog audio signals of plural channels into respective one-bit bitstream data at a bit rate based on the clock signals and wherein said second converter circuit is a delta sigma modulator of a digital input type.

23. An audio signal mixing device as recited in claim 21 wherein said first converter circuit included in at least one of said audio signal interfaces is a delta sigma modulator that converts digital audio signals of plural channels into respective one-bit bitstream data at a bit rate based on the clock signals and wherein said second converter circuit is a delta sigma modulator of a digital input type.

24. An audio signal mixing device as recited in claim 21 which includes only one said supply circuit that supplies predetermined clock signals and wherein a common clock signal is supplied from said supply circuit to another circuit so that all necessary processes are executed in synchronism in response to the common clock signal.

25. An audio signal mixing device as recited in claim 21 which further comprises a reception interface that receives said single time-divisionally multiplexed bitstream data outputted from said second converter circuit, said reception interface canceling time-divisional multiplexing of the received bitstream data on the basis of the clock signals to separate the bitstream data channel by channel, and a PCM conversion circuit that converts the separated bitstream data of each said channel into plural-bit PCM data.

26. An audio signal mixing device as recited in claim 25 wherein said supply circuit that supplies predetermined clock signals is provided in said reception interface so that the clock signals are supplied via said reception interface to another circuit.

27. A method of coding an audio signal, said method comprising the steps of:

receiving analog audio signals of plural channels;

converting the received analog audio signals of plural channels into respective one-bit bitstream data at a predetermined bit rate, using a pulse-density-modulation;

time-divisionally multiplexing the respective one-bit bitstream data of the individual channels in such a manner that said analog audio signals of the individual channels are converted into one-bit multiplexed bitstream data;

weighting said multiplexed bitstream data with a digital coefficient to produce first multiplexed plural-bit digital data corresponding to the multiplexed bitstream data;

receiving second multiplexed plural-bit digital data to be mixed with said first multiplexed plural-bit digital data;

adding said first multiplexed plural-bit digital data and second multiplexed plural-bit digital data to produce added multiplexed digital data; and performing a delta sigma modulation on the added multiplexed digital data to produce single time-divisionally multiplexed bitstream data.

28. A method of coding a plurality of audio signals, said method comprising the steps of:

receiving sets of plural-channel analog audio signals;

converting the received plural-channel analog audio signals into respective one-bit bitstream data at a predetermined bit rate, using a pulse-density-modulation;

for each said set, time-divisionally multiplexing the respective one-bit bitstream data of the individual channels in such a manner that said plural-channel analog audio signals are converted into one-bit multiplexed bitstream data, so as to produce one said one-bit multiplexed bitstream data for each of said sets;

weighting said multiplexed bitstream data for each of said sets with a digital coefficient unique to said set to produce multiplexed plural-bit digital data corresponding to the multiplexed bitstream data for said set;

adding together the produced multiplexed plural-bit digital data to produce added multiplexed digital data; and performing a delta sigma modulation on the added multiplexed digital data to produce single time-divisionally multiplexed bitstream data.

* * * * *